US006769984B2

(12) United States Patent
Duhamel et al.

(10) Patent No.: US 6,769,984 B2
(45) Date of Patent: *Aug. 3, 2004

(54) METHOD FOR PLAYING AN AUXILIARY GAME WITHIN A PRIMARY GAME WITH A PRIZE REWARDING SYSTEM

(75) Inventors: Gérald Duhamel, Drummondville (CA); Marie-Claude Gagnon, Drummondville (CA)

(73) Assignee: Labtronix Concept Inc., Drummondville (CA)

(*) Notice: Subject to any disclaimer, the term of this patent is extended or adjusted under 35 U.S.C. 154(b) by 3 days.

This patent is subject to a terminal disclaimer.

(21) Appl. No.: 10/215,264

(22) Filed: Aug. 9, 2002

(65) Prior Publication Data

US 2004/0029631 A1 Feb. 12, 2004

(51) Int. Cl.[7] .................................................. A63F 13/00
(52) U.S. Cl. ........................ 463/20; 273/274; 273/138.1
(58) Field of Search .............................. 273/274, 138.1; 463/11, 17, 13, 12, 14, 20

(56) References Cited

U.S. PATENT DOCUMENTS

| | | | | |
|---|---|---|---|---|
| 5,393,057 A | | 2/1995 | Marnell, II | |
| 5,494,296 A | | 2/1996 | Grassa | |
| 5,570,885 A | | 11/1996 | Ornstein | |
| 5,586,766 A | | 12/1996 | Forte et al. | |
| 5,630,753 A | | 5/1997 | Fuchs | |
| 5,664,999 A | | 9/1997 | Kurihara | |
| 5,743,800 A | | 4/1998 | Huard et al. | |
| 5,823,874 A | | 10/1998 | Adams | |
| 5,848,932 A | | 12/1998 | Adams | |
| 6,179,710 B1 | | 1/2001 | Sawyer et al. | |
| 6,203,430 B1 | | 3/2001 | Walker et al. | |
| 6,311,976 B1 | | 11/2001 | Yoseloff et al. | |
| 6,406,369 B1 | | 6/2002 | Baerlocher et al. | |
| 6,416,406 B1 | * | 7/2002 | Duhamel | 463/12 |
| 2001/0000778 A1 | | 5/2001 | Sines et al. | |

FOREIGN PATENT DOCUMENTS

| | | |
|---|---|---|
| EP | 0 797 175 A1 | 9/1997 |
| EP | 0 971 326 A2 | 1/2000 |
| GB | 2 170 938 A | 8/1986 |
| GB | 2 270 005 A | 3/1994 |

* cited by examiner

*Primary Examiner*—Vishu K Mendiratta
(74) *Attorney, Agent, or Firm*—Ogilvy Renault; James Anglehart

(57) ABSTRACT

Method of processing primary game outcomes in order to determine a prize in an auxiliary game comprising: establishing a first class of outcomes associated with a credit event, a second class of outcomes associated with a no-credit event, a third class of outcomes associated with a non-event hold and a fourth class of outcomes associated with a tradable event in the auxiliary game; monitoring the credit events over a predetermined number of past events in said auxiliary game and awarding at least one prize when at least one of the predetermined numbers or configurations of credits occur. The method further allows the player to exchange tradable events for credit or no-credit events. This invention allows a plurality of primary games to share a common auxiliary game and balances, for each primary games, the chances of winning a prize in the auxiliary game.

18 Claims, 12 Drawing Sheets

Fig 12

Hit rates of different auxiliary game embodiments with lotto, bingo and keno games

| | Embodiments \ Games | Bingo | Keno | Lotto |
|---|---|---|---|---|
| 400 | Binary distribution | 84.00% | 79.00% | 91.20% |
| 401 | Preferred embodiment | 40.40% | 28.20% | 9.80% |
| 402 | Exchange with accumulation | 15.00% | 32.80% | 18.40% |
| 403 | Exchange with random number | 20.20% | 39.00% | 21.60% |

METHOD FOR PLAYING AN AUXILIARY GAME WITHIN A PRIMARY GAME WITH A PRIZE REWARDING SYSTEM

RELATED APPLICATIONS

This application is related to patent application Ser. No. 09/496,280 entitled METHOD FOR PLAYING AN AUXILIARY GAME WITH PRIZE REWARDING SYSTEM, filed Feb. 1, 2000, now U.S. Pat. No. 6,416,406, the specifications of which are hereby incorporated by reference.

This application is further related to patent application Ser. No. 10/118,342 entitled METHOD OF AWARDING AN AUXILIARY GAME PRIZE ALONG WITH A POKER GAME, which is a continuation-in-part of U.S. Pat. No. 6,416,406, the specification of which applications are hereby incorporated by reference.

FIELD OF THE INVENTION

The present invention relates to a game comprising an auxiliary game and its playing method.

BACKGROUND OF THE INVENTION

In recent years, numerous strategies have been used to maintain the player's interest and to provide excitement throughout his play experience. One of these strategies is to add an auxiliary game which outcome is influenced by the outcome of the primary game, whether the auxiliary game is a progressive jackpot, a bonus round, or a totally different secondary game.

The addition of a progressive jackpot is really popular since it is generally displayed for patrons to see on special display means over the banks of participating machines. Generally, these progressive jackpots are really generous and motivate the player by their life-changing nature. However, the chances of winning one of these jackpots are slim and shared by all players using the machines participating in the progressive jackpot. By their nature, these jackpots are often more attractive to occasional players than to local and frequent players.

There are many different types of bonus rounds associated with line games. However, most of them can be divided in two classes: instant and accumulation bonuses. The instant bonuses are the most common; they are triggered by the occurrence of a predetermined outcome, and they do not last beyond the current play. The instant bonuses can award an instant prize or multiply the primary game prize. They can also present themselves as a second-screen game wherein the player chooses at least one of several indicia, or wherein an indicator such as a wheel determines or reveals the value of the bonus prize. These prizes can be predetermined or accumulated; they can also consist in a predetermined number of free spins, during which the primary pay table or a special bonus pay table applies. As soon as the bonus round is over, the player gets back to the primary game. The previous bonus has no influence on the chances of triggering another bonus round in the future. Unfortunately, the excitement of the player does not last long. Furthermore, this kind of bonuses can frustrate players if they feel those bonuses slow the game and award too many small prizes.

Bonuses of the second class, the accumulation bonuses, are triggered by the accumulation of a predetermined indicium or group of indicia over the course of a number of spins or plays. When the predetermined indicium is displayed in the primary game, it is cumulated. When the player has gathered the predetermined number of indicia, he is awarded a bonus prize. A prize can also be awarded when a predetermined triggering event occurs; the value of this bonus prize is determined according to the number of indicia gathered, randomly or using a pay table. This kind of bonuses is more interesting than the instant one since the excitement of triggering the bonus lasts over many plays, but the player is often unaware of the indicia accumulation or the trigger-event occurrence. Thus, the player does not always know when he has a real chance of triggering the bonus round and winning a big prize.

U.S. Pat. No. 6,203,430 describes a bonus in which at least one symbol is tracked and gathered. However, in this case, an occurrence can expire after a predetermined length of time or a number of spins. When an occurrence expires, the count decreases by one. A prize is won when the game system recognizes that the count equals or exceeds the required number to win. After a win, said required number is subtracted from the count, or the latter is reset to zero (0). In this game, all outcomes have an influence on the proportion of outcomes that are monitored and thus on the occurrence of a bonus payout. Nevertheless, each outcome can only be used once to award a bonus.

U.S. Pat. No. 5,393,057 describes another type of auxiliary games: a primary game coupled with a secondary game. The nature and rules of this secondary game can be totally different from those of the primary game. In this patent, a bingo-matrix display (the secondary game) is coupled to a poker game (the primary game). The occurrence of certain predetermined events in the poker game induces a modification of the bingo matrix display. The rules of standard bingo apply to this bingo-matrix, and the player can win a prize whenever a winning pattern is completed. Since not all poker hands have an influence on the chances of winning in the auxiliary game, plays do not all have the same importance. Moreover, since the bingo matrix is never reset to zero (0), the player knows he only has to play long enough to win an auxiliary prize. No event has a negative influence on his chances; there is no "near-miss" effect.

In conclusion, there have been no successful strategies to maintain the interest of players throughout their participation in primary games while giving them a feeling that each spin or play is important and can offer them more than one chance of winning a bonus prize.

SUMMARY OF THE INVENTION

Accordingly, it is an object of the present invention to provide a method of playing an auxiliary game with a primary game, a method that maintains the interest of players and improves their pleasure of participating in the primary game.

A second object of the invention is to make each primary game round an important one.

A third object of the invention is to allow a game round to contribute to more than one bonus-trigger events.

A further object of the invention is to display information regarding the credits obtained in a predetermined number of events so that players can evaluate their chances of winning an auxiliary-game prize. This display also sustains the thrill throughout the game so the players will continue to play and to generate profits for the apparatus owners.

It is also an object of the present invention to provide an auxiliary-game progressive payoff to maintain the interest of the player.

A further object of the invention is to maintain the thrill by letting players gather the number of credits needed to win prizes in a number of games greater than the number of outcomes influencing results in the auxiliary game. A player's chances of winning an auxiliary-game prize are therefore increased.

A final object of the invention is to allow a plurality of machines or tables linked via a network or other communication means to the same auxiliary game device, to share the same monitoring and display means and thus participate in the same auxiliary game, even if they offer different games to the players.

According to the objects of the invention, a method of awarding a prize in an auxiliary game played along with a primary game is provided. The method comprises steps such as establishing a first class of outcomes in the primary game associated with credit events in the auxiliary game, a second class of outcomes associated with no-credit events in the auxiliary game, a third class of outcomes associated with non-event holds in the auxiliary game and in some instances, a fourth class of outcomes associated with tradable events; monitoring credits in the auxiliary game over a predetermined number of events; and awarding a prize when a predetermined number or configuration of credits are present in this predetermined number of events in the auxiliary game, whereby avoiding no-credit events within a series of non-event holds and credit events increases a player's chances of winning an auxiliary-game prize.

A preferred embodiment of the invention comprises an electronic gaming apparatus wherein a primary game is linked to an auxiliary game that works according to the method defined above. A display of the information monitored by the auxiliary game should be placed above the display of the primary game and should be easily understandable by an untrained player. The primary game comprises an instant game wherein certain predetermined events produce credit events or trigger the credit selector, losing outcomes produce no-credit events, and all the other outcomes are non-event holds or tradable events.

BRIEF DESCRIPTION OF THE DRAWINGS

The following description and accompanying drawings will facilitate the understanding of the features, aspects and advantages of the present invention:

FIG. 12 is a table of auxiliary game hit rates according to different games and embodiments;

DETAILED DESCRIPTION OF THE PREFERRED EMBODIMENTS

This invention can be used with any game: live or video card games, instant games or any other gambling games. Moreover, this invention can be used as part of a machine or as an auxiliary display, which can be added to any pre-existing game device or table.

Figure 1:
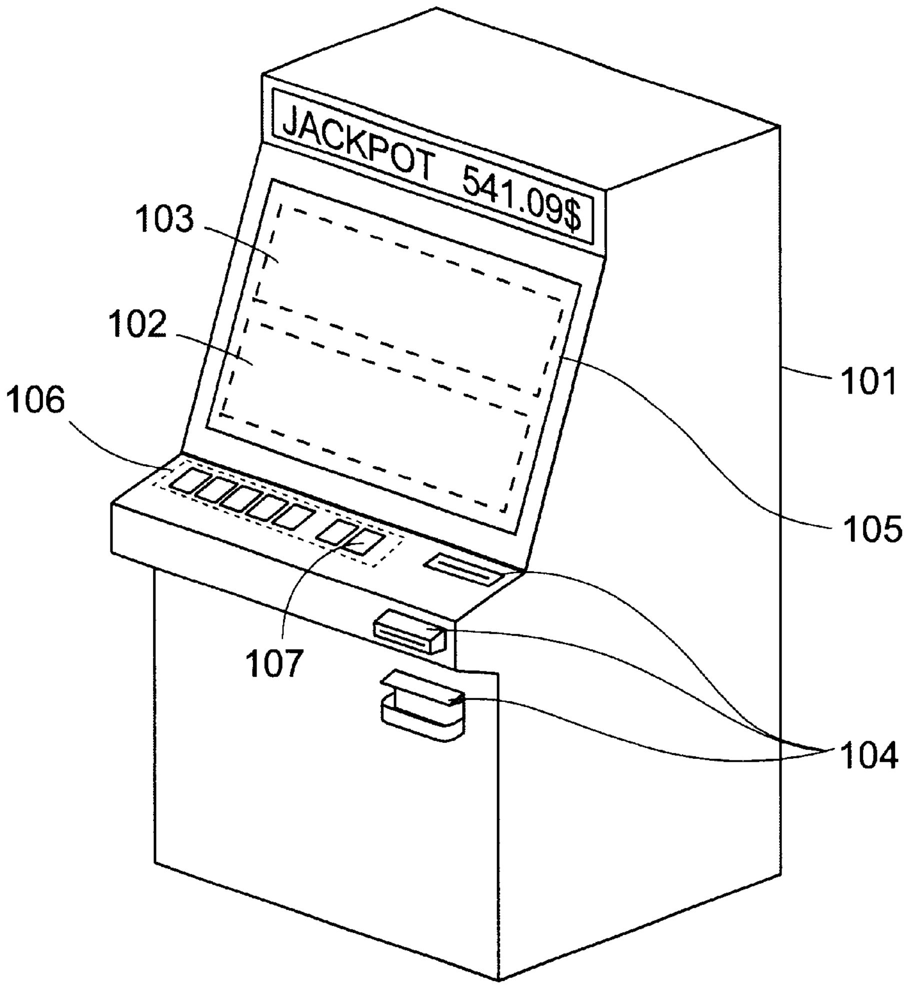
FIG. 1 is a schematic representation of an electronic gaming apparatus built in accordance with the present invention.

FIG. 1 illustrates an electronic gaming apparatus 101 built in accordance with the present invention, which includes an auxiliary game 103 coupled with the primary game 102. The electronic gaming apparatus 101 comprises a playing screen 105, a bet acceptor 104—whether the bets are placed in currency (bills or coins) or with a player card in a cashless environment—and some controls (usually buttons) 106 to actuate the game, one control being a reset button 107 to set the auxiliary game and its display back to zero (0).

Figure 2:
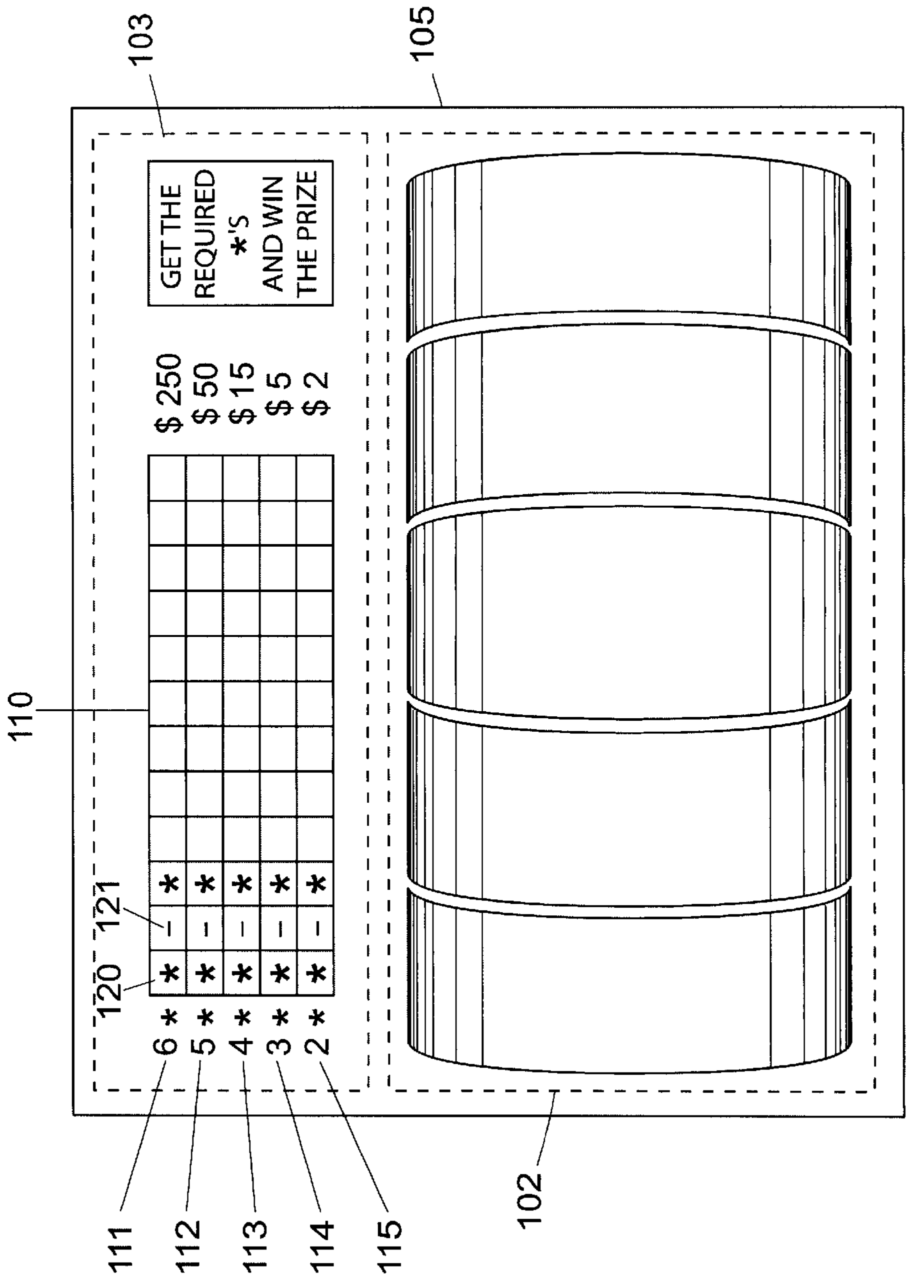
FIG. 2 is a schematic representation of the playing screen on the electronic gaming apparatus showing the slot machine embodiment of FIG. 1.

FIG. 2 shows the gaming screen of our preferred embodiment 105 when the player begins to play. The auxiliary game 103 is displayed as a matrix 110 over the primary game 102. Usually, said matrix already contains credits 120 and no-credits 121 from previous plays. The auxiliary-game matrix displays information 111 to 115 to notify the player about the prizes awarded in the auxiliary game 103. By reading the bottom line 115, the player learns that he could win from two dollars ($2.00) by gathering two stars (credits) up to two hundred and fifty dollars ($250.00) by gathering six (6) stars 111.

Figure 3:
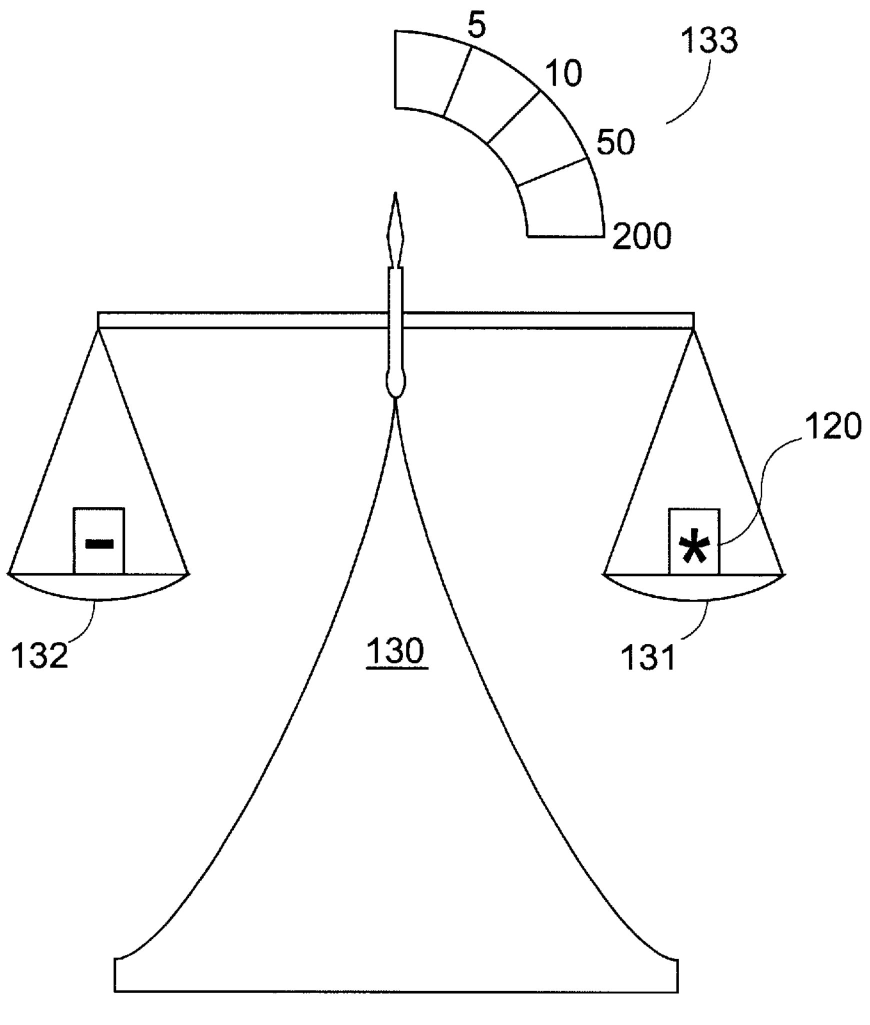
FIG. 3 is a schematic representation of an alternative display for the auxiliary game.

It has to be understood that the auxiliary-game display can take many forms and shapes. A matrix display, as shown in FIG. 2 is our preferred embodiment. FIG. 3 illustrates an alternative, shaped as a balance. In such display, a balance 130 with two plates—one for credit events 131 and the other for no-credit events 132—displays to the player the differential between the numbers of gathered credit events and no-credit events. The prizes associated to these differentials are also displayed 133 in a way that allows the player to follow the progress of the auxiliary game. With such this display, the rules of evaluation are different and the prizes associated would also be different than with the matrix of our preferred embodiment.

Figure 4:
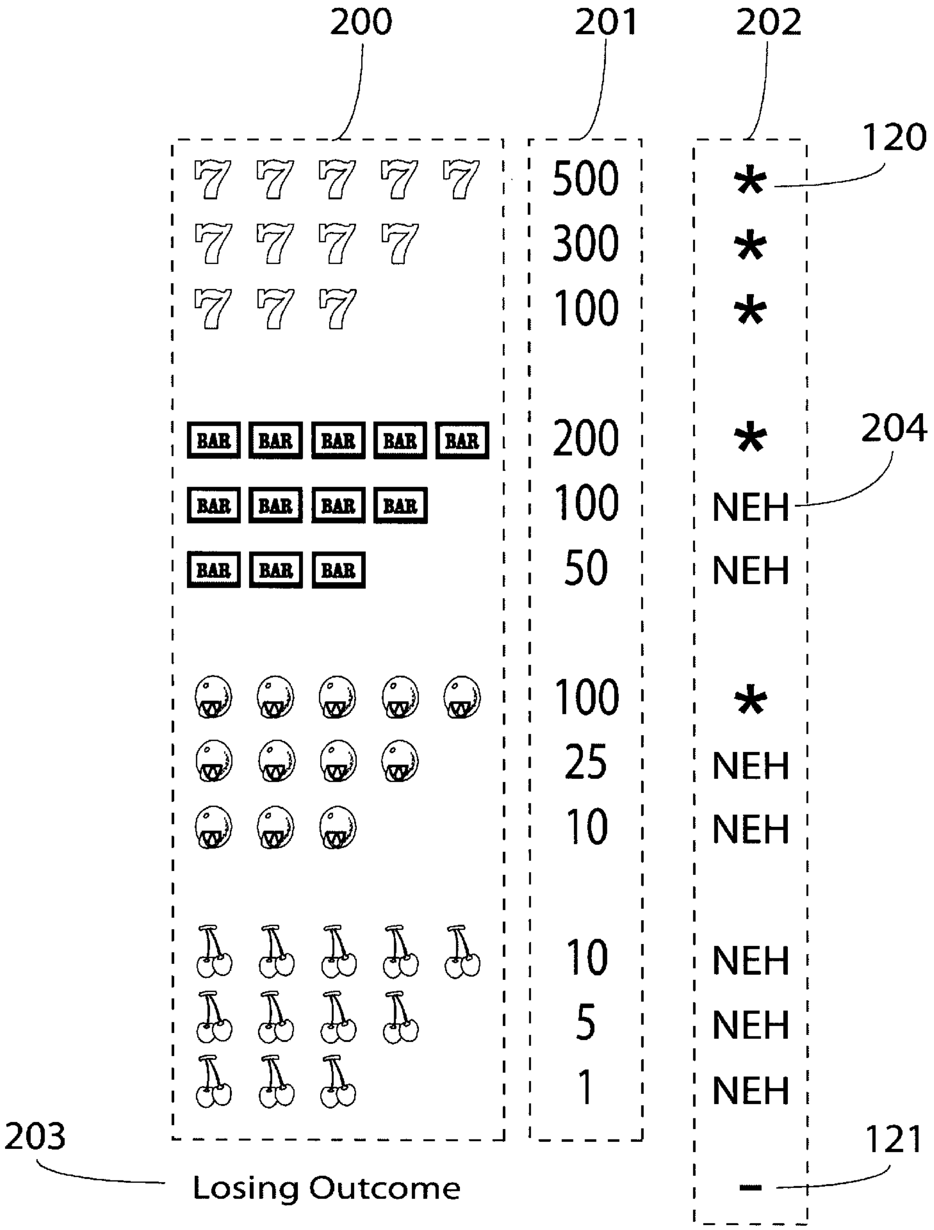
FIG. 4 is a pay table for a five-line game comprising a primary game coupled with an auxiliary game.

FIG. 4 shows an example of a pay table for a five-line slot game. This pay table, not only gives information about the primary game but also about the auxiliary game. The first column 200 describes the winning outcomes in the primary game, while the next column 201 indicates the corresponding prizes. The third column 202 indicates to which class of events in the auxiliary game corresponds each outcome. At least two out of three classes of events are determined and monitored in the game: credit events 120 and no-credit events 121. The third class is a non-event hold 205 which is not inscribed in the matrix. The no-credit events 121 usually correspond to the primary-game losing outcomes 203.

In the primary game, a first class of outcomes is determined, usually corresponding to the events having the lowest hit rates and awarding the highest prizes. This first class of outcomes is associated with credit events 120. These credit events 120 are inscribed and monitored in the matrix 110; when a predetermined number of credits appears in said matrix, a bonus prize is awarded to the player. The second class of events is associated with no-credit events 121 and usually corresponds to losing outcomes in the primary game. These no-credit events are also inscribed in the matrix 110. Consequently, it is not desirable to have no-credit events since they lower the chances of winning a bonus prize, as explained further. Finally, the third class of events, associated with non-event holds 204, corresponds to all of the outcomes not already part of a class of events, but not necessarily part of the list of winning outcomes. For example, in a five-reel slot game, getting identical symbols in the four (4) last position of a line does not award a prize, but could be associated with a non-event hold. This class is not requisite: it does not appear in the matrix 110 and is mostly used to raise the number of games necessary to get a full matrix, and thus to raise the player's chances of winning a bonus prize. The auxiliary game is never over: when the matrix 110 is full, the next event "pushes" the oldest one out of the matrix 110. In fact, the monitoring display is reset to zero (0) only when the player desires to do so, by pushing the reset button 107; there is no automatic reset. When a bonus prize is awarded, the matrix display reflects that winning but is not modified in any other way.

Figure 5:
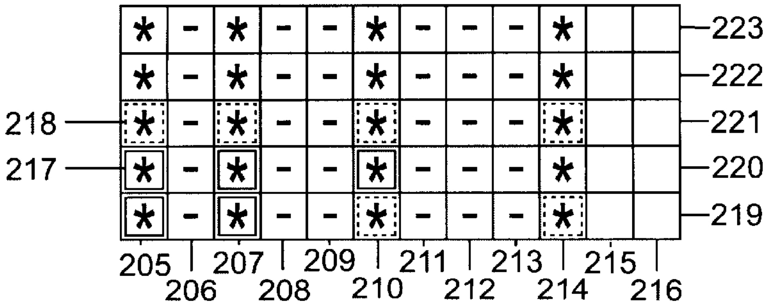
FIG. 5 is a schematic representation of the matrix display of the auxiliary game.

FIG. 5 shows a matrix with a certain number of outcomes already inscribed. The non-event holds do not inscribe an entry in the matrix, and thus the evaluation of the number of games played to get that matrix configuration is impossible. Credit events 120 and no-credit events 121 are inscribed on each line of the columns 205 to 216, one column for each event. For example, the player got three 7s as best line outcome in the primary game. According to the pay table of FIG. 4, this outcome corresponds to a credit event 120. This event is inscribed in the matrix on each line of the currently played column 214. After the credit event 120 is inscribed, the matrix is evaluated to determine if bonus prizes should be awarded. The credit events that have already been used to award a prize are identified as such in the matrix, in this example, they are framed by solid lines 217; they do not count toward this evaluation or any subsequent one. These already-used credit events can also be erased altogether from the matrix. It is established by the game that the player has gathered enough credits 120 to be awarded two (2) prizes, one for gathering two (2) credits 120 on the bottom line 219 and another for gathering four (4) credits 120 on the corresponding line 221. These bonus outcomes are displayed for the player, for example, by framing the credits with dashed lines 218.

Figure 6:
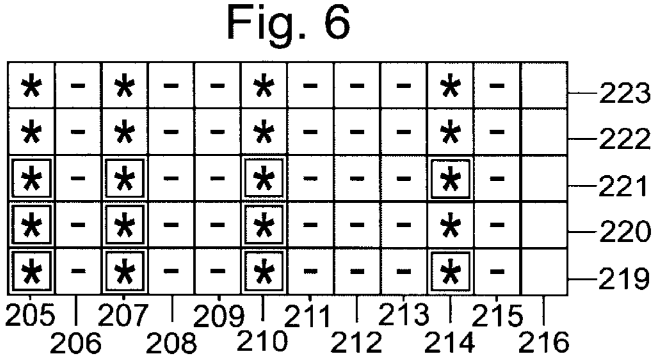
FIG. 6 is a schematic representation of the matrix display of the auxiliary game taken a step further.

FIG. 6 indicates the same game, one step later, each step corresponding to a new event inscribed into the matrix. This time, the player got a loosing outcome, which inscribes a no-credit event 121 into the current column 215. Note that the credit events 120 part of the last bonus prize-awarding outcome are now framed with solid lines.

Figure 7:
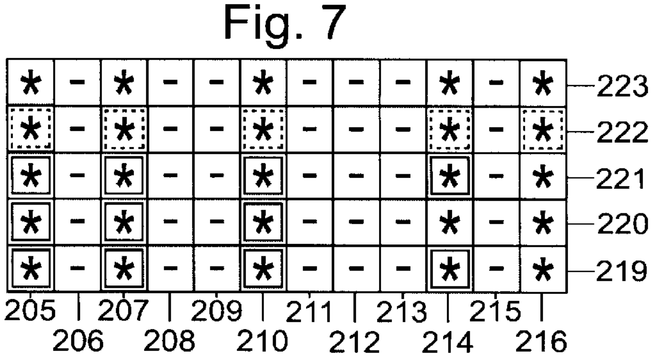
FIG. 7 is a schematic representation of the matrix display of the auxiliary game taken a step further.

FIG. 7 shows the same matrix an additional step later. Once again, the player got an outcome worth a credit event 120, as shown in the current column 216. Once again, the matrix is evaluated to establish if enough credits have been gathered to award bonus prizes. The player is awarded a prize for gathering five (5) credits 120 in the corresponding line 222.

Figure 8:
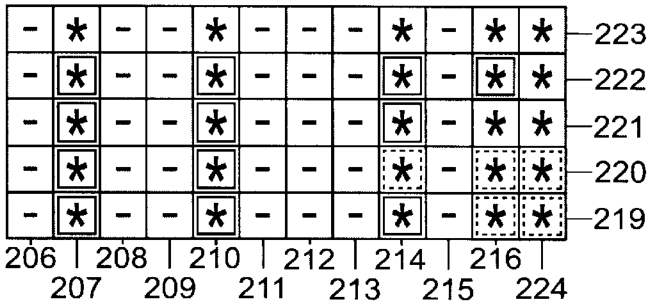
FIG. 8 is a schematic representation of the matrix display of the auxiliary game taken a step further.

FIG. 8 shows what happens when the matrix is full and a new event is inscribed into the matrix: the oldest event column 205 is "pushed" out of the matrix to leave place for the new event column 224. In this example, a credit event 120 is inscribed and the evaluation for bonus prizes is done: two (2) more bonus prizes are awarded to the player for gathering two (2) and three (3) credit events 120 on the corresponding lines 219 and 220.

Figure 9:
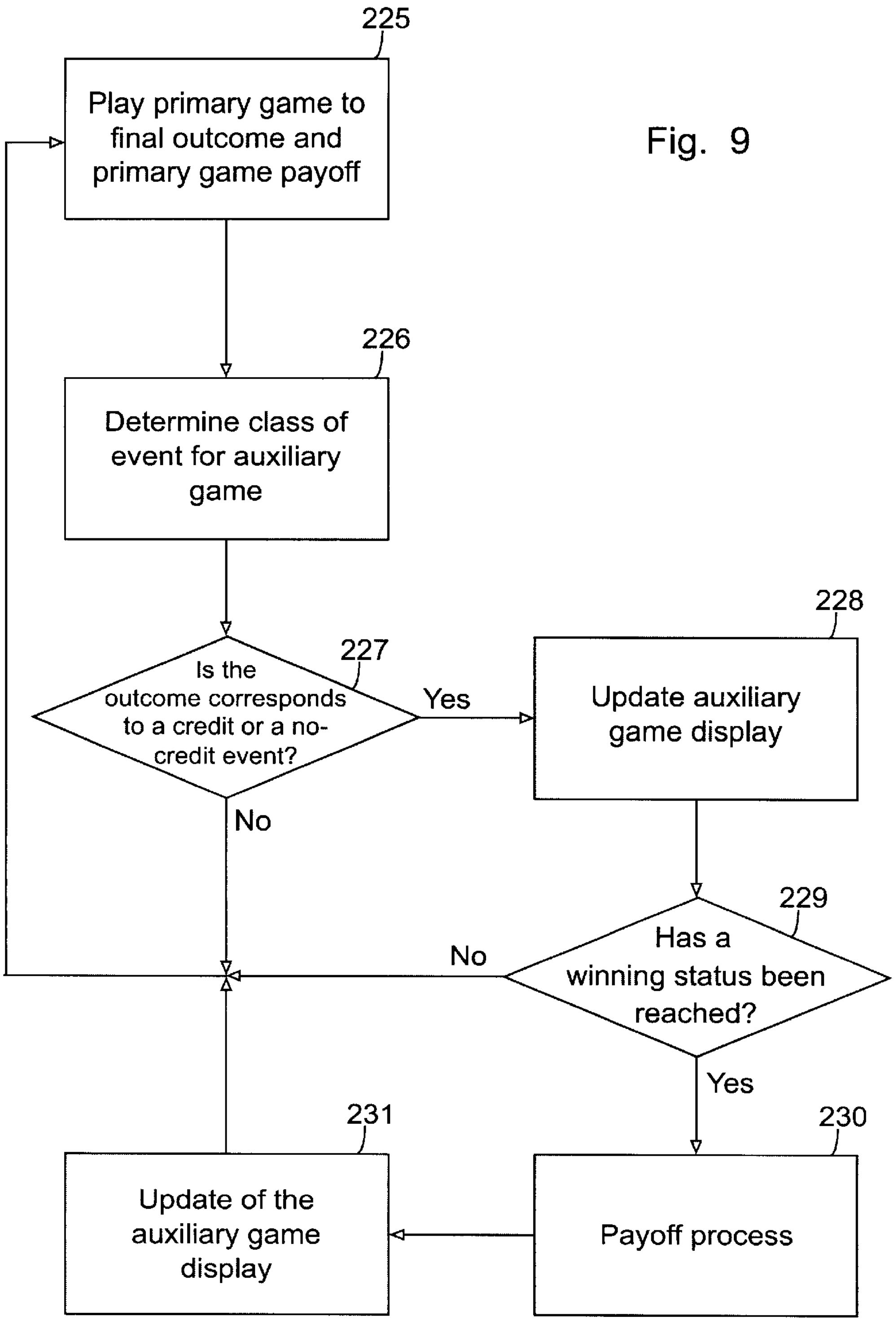
FIG. 9 is a flow chart of the auxiliary-game playing steps according to one embodiment.

FIG. 9 explains in more details all the steps of the game process for our preferred embodiment. After the player has placed his bet and activated the apparatus, an outcome is displayed on the machine, said outcome constituting the final outcome of the primary game. To complete the play of the primary game 225, the corresponding prize is awarded. Then, the final outcome is evaluated to specify its class of event participation 226. If the outcome corresponds to a credit or a no-credit event 227, the auxiliary game display is updated to show this new event 228. Then, the game establishes whether the auxiliary game has reached a winning status or not 229. If a winning status is reached, a display indicates so to the player and the prize is awarded. The auxiliary game display is updated 231 to reflect the fact that some credits have been used for awarding a prize. Then, the player can place a new bet to play again the primary game.

The embodiment above demonstrates a really simple classification: each outcome is determined as being part of a certain class. In another embodiment, the classes can be associated not only to winning and losing lines but to the occurrence of certain indicia. However, the process of the game would not be modified by this addition, only the frequency of winning a bonus prize would be.

In another embodiment (the best mode) an outcome can be associated with a non-final class; said final association occurring using a second determinant such as a second Random Number Generator (RNG) or a counter.

Figure 10:
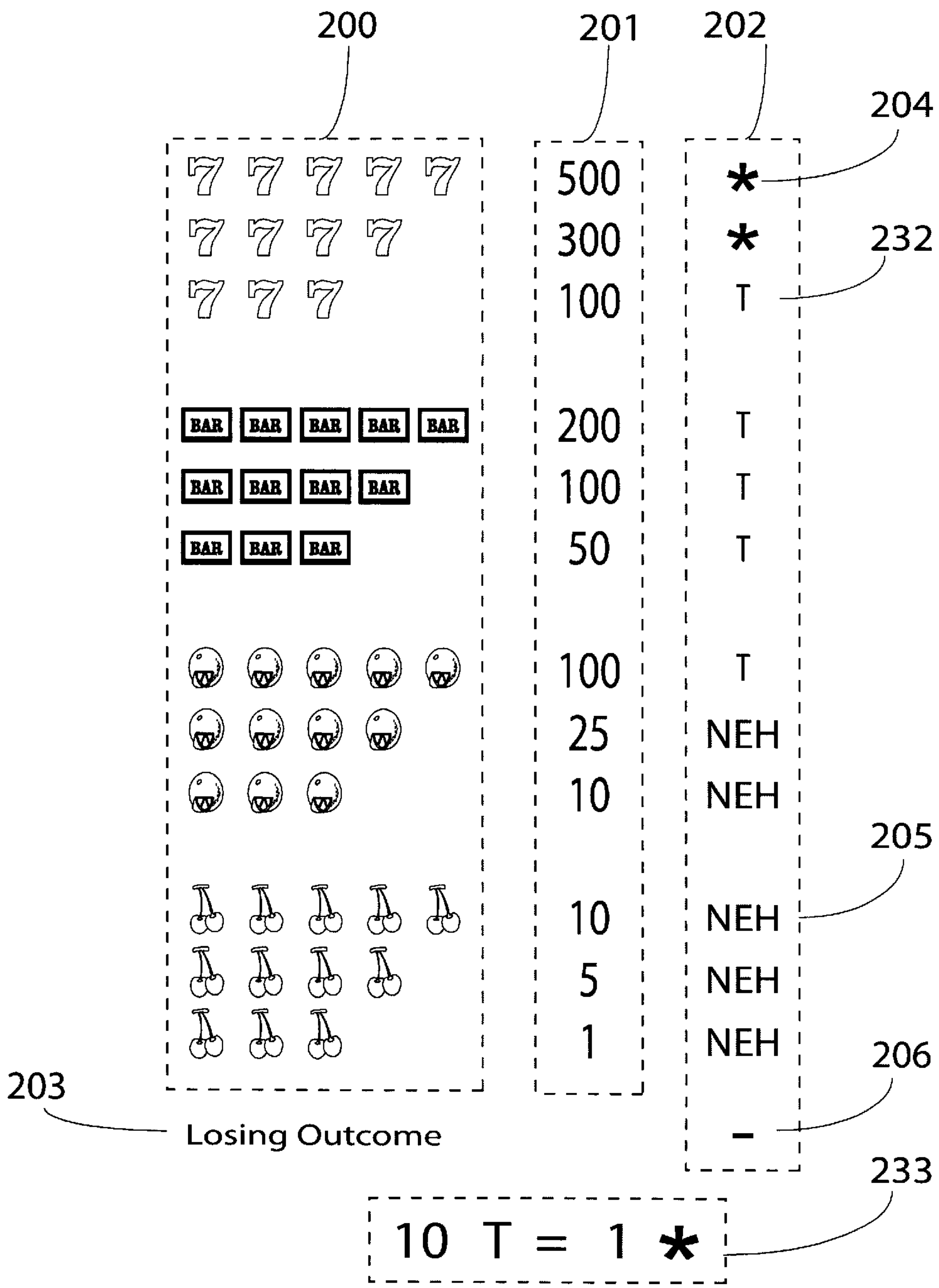
FIG. 10 is a pay table for a five-line game comprising a primary game and an auxiliary game wherein a second determinant is used to determine the class of events.

FIG. 10 demonstrates the pay table of a five-line slot game offering the feature mentioned above. Some of the winning outcomes are associated with tradable events 232 which can be traded for credit events, according to a second determinant. The second determinant can be a second RNG or any other mean, like a counter. In our preferred embodiment, a counter is used. Each time the player gets one of the outcomes associated with a tradable event 232, a unity is added to the counter until a predetermined number has been reached. This information is also given on the pay table 233. The tradable events are traded for a credit event 120; the counter is then reset to zero (0) or its number is subtracted by the predetermined required number. In our preferred embodiment, this trade is mandatory and automatic, but we can imagine a game where the player has the choice of trading the tradable events immediately or keeping and trading them at a more appropriate time, later in the game. This feature offers the player greater strategic challenge and control over the game.

Figure 11:
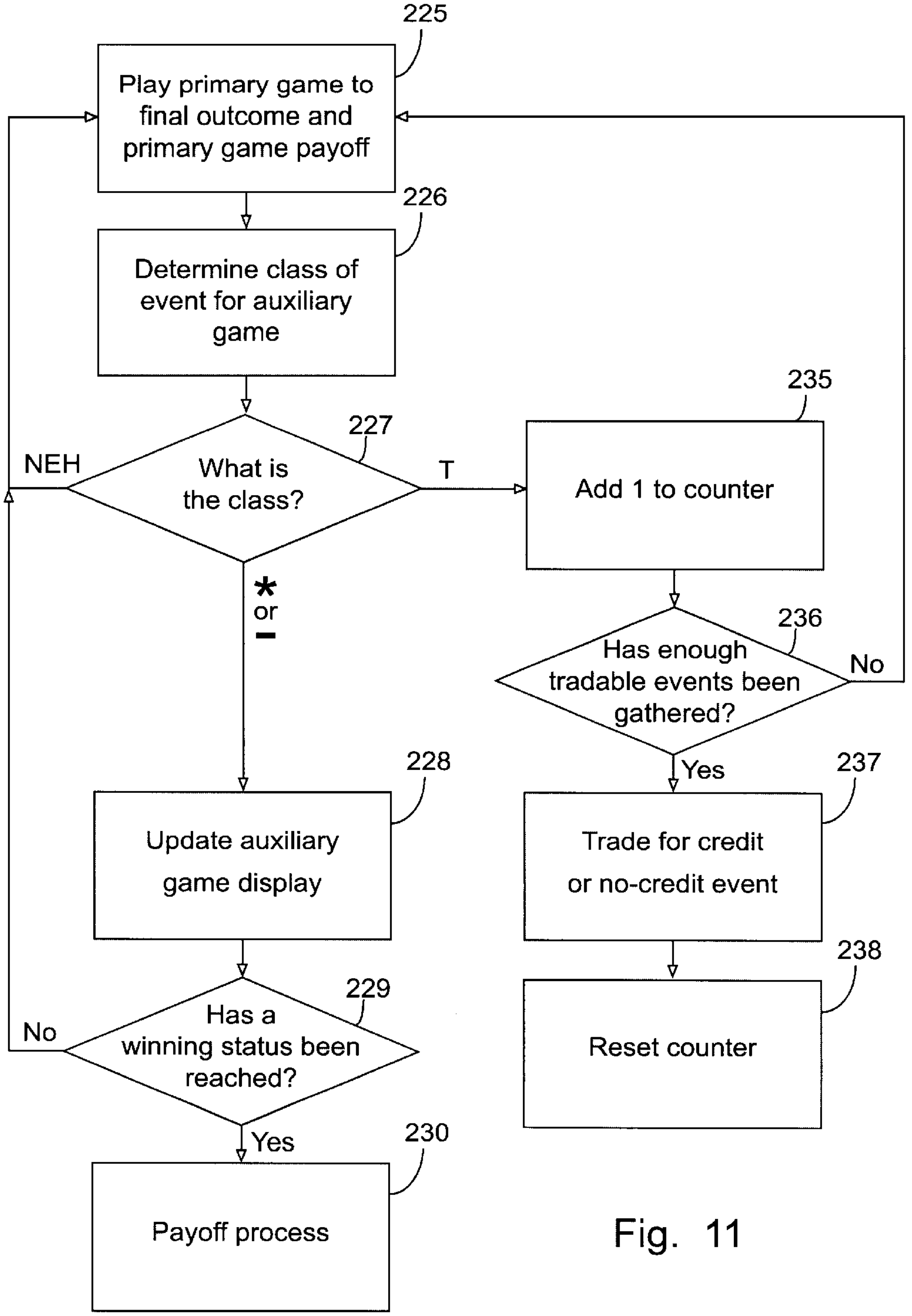
FIG. 11 is a flow chart of the auxiliary-game playing steps wherein a second determinant is used to determine the class of events.

FIG. 11 explains in more details all the steps of the game process for the embodiment explained above. After the player has placed his bet and activated the apparatus, an outcome is displayed on the machine, said outcome constituting the final one of the primary game. To complete the play of the primary game 225, the corresponding prize is awarded. Then, the final outcome is evaluated in regard with its class of event participation 228. If the outcome corresponds to a credit event or a no-credit event 227, the auxiliary-game display is updated to show this new event 228 and the game goes one like explained above. On the other hand, if the outcome corresponds to a tradable event, the counter 235 is incremented by one. If the predetermined number of gathered tradable events is reached 236, these events are traded for a credit event 237 and the counter is reset to zero (0) 238. The auxiliary game Other primary games can also be coupled to this auxiliary game, such as other instant games (bingo, lotto and keno) or live games (poker, blackjack, roulette, etc.). The classes of events are determined to comply with the game rules. Some games, such as bingo, keno and lotto have simpler probabilities, since only changing the number of balls drawn can modify them. Blackjack probabilities are also simple; the player has about one in two chances to win and about one on twenty to get a Blackjack or Twenty-One. In the other hand, poker, roulette and craps are more complex games with more different winning outcomes and thus more easily adjustable. But none of these games have the flexibility of the line games, which can really be adjusted to comply with different auxiliary game limitations. In all games, the class determination criteria are easily adjustable to have an effect on the auxiliary game as illustrated in FIG. 12 wherein the hit rates of the auxiliary game are given for keno, lotto and bingo games. These hit rates have been evaluated with simulations of simple embodiment of each type of game and the same outcomes have been used to evaluate the auxiliary game hit rates for each embodiment. The first auxiliary game embodiment 400 comprises the association of all primary game winning outcomes to credit events and all primary game losing outcomes to no-credit events. The second embodiment 401 adds the non-event holds to the equation, this time, the most uncommon winning outcomes in the primary game are associated with credit events, while most of the winning outcomes are associated with non-event holds. The third 402 and fourth 403 embodiments have both replaced the non-event holds with tradable events. The tradable events are gathered and exchanged when the counter reaches ten (10) in the third embodiment 402 while the player has one chance in six to exchange a tradable event for a credit event in the fourth embodiment 403.

In most of the cases, the tradable events are exchanged for credit events, but in some instances, it can be interesting to exchange them for no-credit events. A game wherein the total hit rate is higher than sixty percent (60%) can offer too many credit events and non-event holds. Offering less credit events could be a solution, but then the player would have to play a lot to inscribe enough credit events in the auxiliary game display to win a prize and the progress of the auxiliary game would be too slow to really interest the player. A better solution in that case would be, not to render the credits scarce, but exchanging tradable events for no-credit events and thus inscribing no-credit events more often. The auxiliary game progress would be fast enough to keep the thrill in the game and, more importantly for the game operators, the interest of the player.

Figure 13:
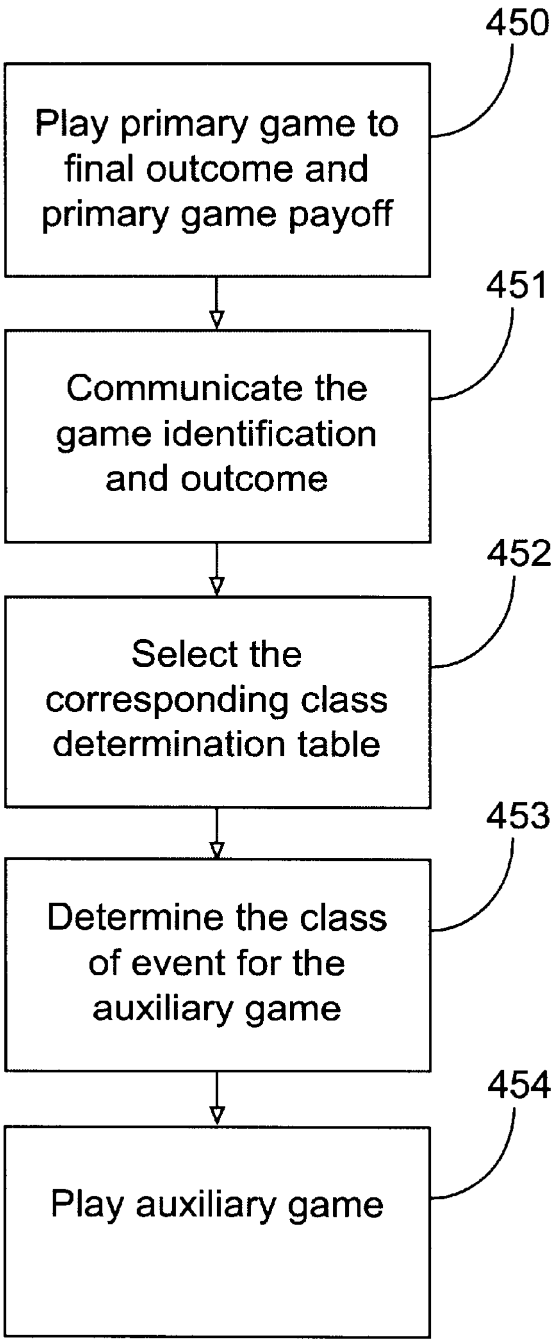
FIG. 13 is a flow chart of the auxiliary-game playing steps when a plurality of machines are linked to a common auxiliary game device.

As stated above, an auxiliary game control, monitoring and display means can be shared by more than one gaming machine, to offer a competition or cooperation feeling to the players. If this auxiliary game is shared by a bank of machines, all offering the same single game to the player, the class determination can be modified in order to offer to the players a hit rate low enough so the offered prizes can be more interesting and can be linked to progressive components. However, the advantage of this invention is allowing the sharing of the auxiliary game by a plurality of games, whether they are on the same machine or different machines. For such an embodiment, which process is illustrated on FIG. 13, the class determination (credit events, no credit events, non-event holds and tradable events) would be different for each game and would reflect the nature and probabilities of the game, as to offer to all players the same chance of winning, independently from their game of choice. Accordingly, the class of events would be determined by the auxiliary-game control means so that a credit originating from a bingo game would have the same weight than one originating from a line game or a lotto game. To that effect, when a primary game is played 450, the identification of this game (including the payout structure identification when more than one is available) and its outcome are communicated to the auxiliary game control means 451. Using the game identification to select the right class determination table 452, the control means determine to which class of event corresponds the outcome of the game 453. After the class has been determined, the auxiliary game is played as described above 454.

Since signals come from more than one game or machine, all device internal clocks must be synchronized so that the order in which the classes are determined and the events inscribed on the display are in the same order than the one of the games that has been played. That way, the prizes are awarded to the players who have inscribed prize-awarding trigger events.

Figure 14:
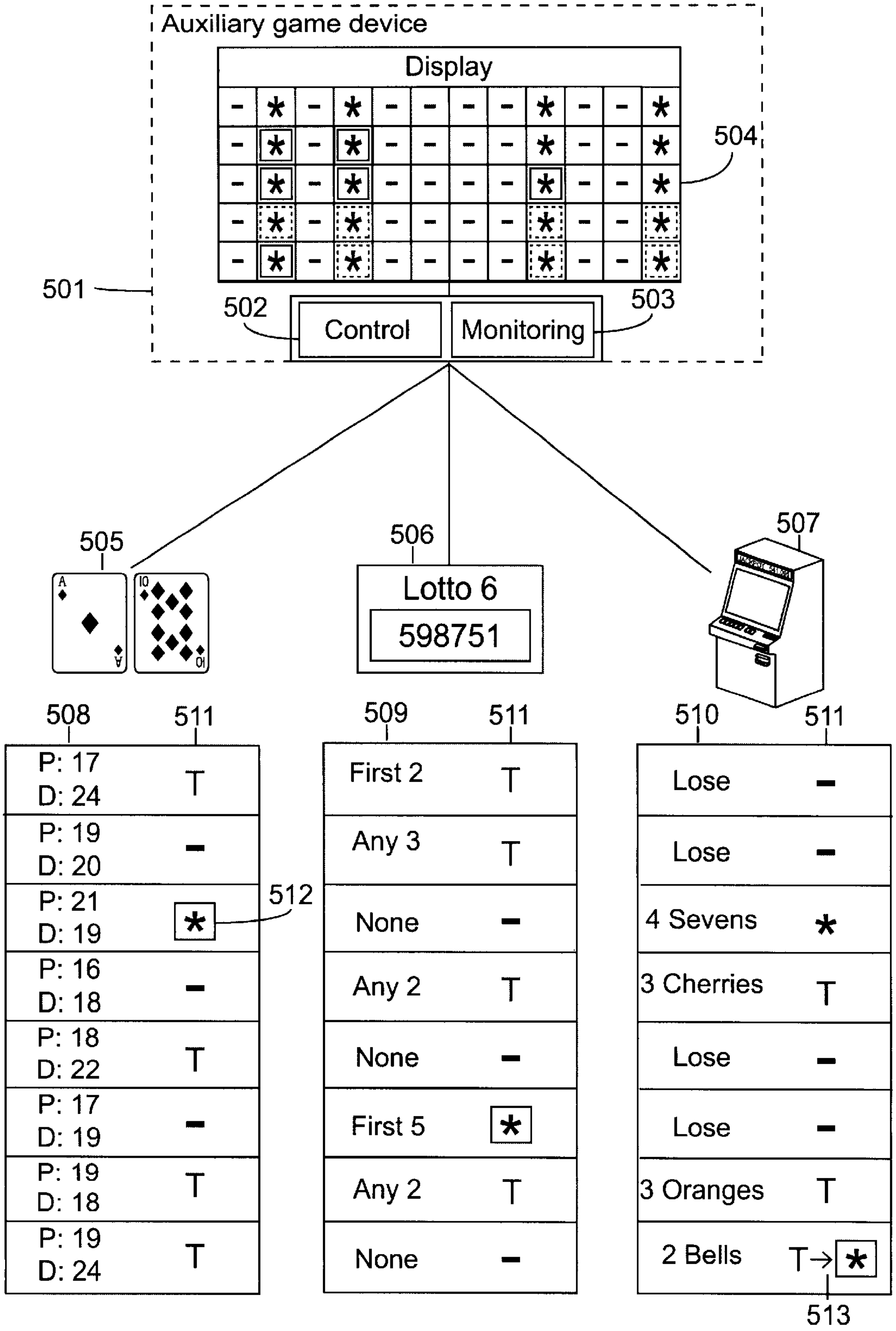
FIG. 14 is an illustration of the game progress when a plurality of machines offering different games are linked to a common auxiliary game device.

FIG. 14 illustrates in more details the sharing of an auxiliary game by a plurality of primary games. Note that more than three (3) games, machines or even banks of machines can be linked. In this simplified illustration, three (3) games are linked to a central auxiliary game device 501, which comprises control 502, monitoring 503 and display means 504. The first player enjoys a live blackjack game 505, the second tries his luck at a lotto game 506 while the third player prefers line games and is currently playing a five-reel game 507. Under each machine is a list of outcomes for the last few games 508 to 510 and the corresponding classes of events 511. The blackjack game outcomes 508 are given as the player's hand (P) and dealer's hand (D), the lotto outcomes 509 are expressed as the position and number of right numbers and finally, the line game outcomes 510 give the best line obtained on that spin. Note that one credit was obtained by exchanging one tradable event 513. When an outcome in the primary game results in a credit in the auxiliary game and said credit is an auxiliary game prize triggering event, this credit is framed in solid line in the list of outcomes and events 512. Assuming all the players play at the same speed, the outcomes occur at about the same time on each machine, and to simplify the model, are analyzed by the auxiliary game control means from the left to the right. The outcomes are sent to the auxiliary game device, which selects, according to the originating game, a class determination table and determines the class of events corresponding to the outcome. If the outcome corresponds to a credit or a no-credit event, said event is inscribed in the matrix (or other display) 504. When a prize-awarding trigger event occurs, a signal is sent to the machine from which the outcome originated to inform the players of a win by a visual or audio signal, or both output.

Figure 15:
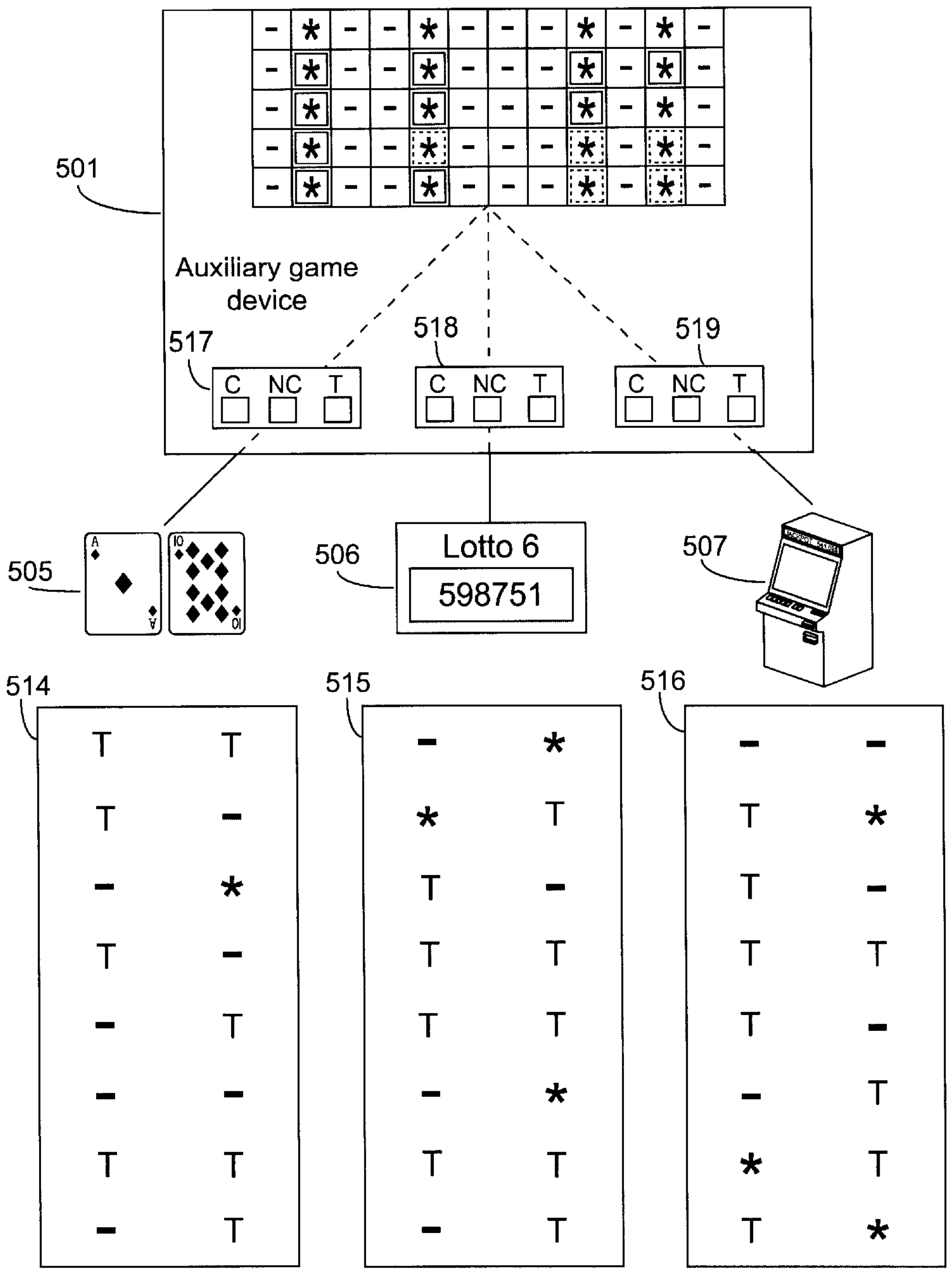
FIG. 15 is an illustration of the game progress when counters are added to gather credit and no-credit events.

When a plurality of machines are linked to a common auxiliary game device, said auxiliary game can go too fast for the players to be really interested in its progress. To face that limitation, the control means can also comprise counters to cumulate the outcomes associated with credit and no-credit events. By using these counters, fewer events are inscribed on the display and the auxiliary game progresses more slowly, allowing the players the time to follow its progress. Each class of events has its own counter and said counters are set to inscribe an event in the matrix when the predetermined number of outcomes have been gathered, except for the tradable events counter, which adds one (1) to the counter of the event for which the tradable events are exchanged. There can be a single set of counters that are shared by all games or each game can have its own set of counters. FIG. 15 illustrates that embodiment. For each game 505 to 507, a list of the last few events have been provided 514 to 516. Each set of counters 517 to 519 accumulates the events for the associated game. As the game is played, for example blackjack 505, outcomes are sent to the auxiliary game control means to be associated with a class of event. The control means select the class determination table corresponding to the game and determine the class of events. The counter 517 corresponding to the determined event is incremented by one (1). If the counter reaches the predetermined threshold, the corresponding event is inscribed on the display 504 and the counter is reset to zero (0), except for the non-event hold counter that adds one (1) to the counter of the event for which the tradable events are exchanged. The auxiliary game is played as explained above.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features herein before set forth, and follows in the scope of the appended claims.

We claim:

1. A method of processing primary-game outcomes in order to determine a prize in an auxiliary game played along with a primary game, the method comprising the following steps:

establishing a first class of outcomes in said primary game associated with a credit event in said auxiliary game;

establishing a second class of outcomes in said primary game associated with a no-credit event in said auxiliary game;

monitoring credit events in said auxiliary game over a predetermined number of past events in said auxiliary game, with said number of past events being constant;

monitoring a plurality of predetermined numbers or configurations of credits, allowing each credit event to contribute to more than one prize awarding criteria; and signaling that a prize in said auxiliary game is to be awarded when a predetermined number or configuration of credits is present in said predetermined number of past events in said auxiliary game, with said number of credits being less than said number of past events.

2. The method of claim 1 wherein:

the first class of outcomes corresponds to predetermined winning outcomes in the primary game; and the second class of outcomes corresponds to losing outcomes in the primary game.

3. The method of claim 1 wherein:

the first class of outcomes corresponds to predetermined outcomes in the primary game; and the second class of outcomes corresponds to outcomes in the primary game that are not part of the first class of outcomes.

4. A method of processing primary game outcomes in order to determine a prize in an auxiliary game played along with a primary game, the method comprising the following steps:

establishing a first class of outcomes in said primary game associated with a credit event in said auxiliary game;

establishing a second class of outcomes in said primary game associated with a no-credit event in said auxiliary game;

establishing a third class of outcomes in said primary game associated with a non-event hold in said auxiliary game;

monitoring credit events in said auxiliary game over a predetermined number of past events in said auxiliary game, with said number of past events being constant;

monitoring a plurality of predetermined numbers or configurations of credits, allowing each credit event to participate in more than one prize-awarding criteria; and signaling that a prize in said auxiliary game is to be awarded when a predetermined number or configuration of credits is present in said predetermined number of past events in said auxiliary game.

5. The method of claim 4 wherein:

the first class of outcomes corresponds to predetermined winning outcomes in the primary game;

the second class of outcomes corresponds to losing outcomes in the primary game; and the third class of outcomes corresponds to all winning outcomes in the primary game that are not part of the first or second class of outcomes.

6. The method of claim 4 wherein:

the first class of outcomes corresponds to predetermined outcomes in the primary game;

the second class of outcomes corresponds to predetermined losing outcomes in the primary game that are not part of the first class of outcomes; and the third class of outcomes corresponds to other outcomes that are not part of the first or second class of outcomes.

7. The method of claim 4 further comprising the step of establishing a fourth class of outcomes in said principal game associated with a tradable event.

8. The method of claim 7 wherein the fourth class of outcomes corresponds to other predetermined outcomes are not part of the first or second class of outcomes.

9. The method of claim 7 wherein the fourth class of outcomes replaces the third class of outcomes.

10. The method of claim 7 wherein the step of monitoring the credit events further comprises the step of exchanging at least one tradable event for another one of said events of the auxiliary game.

11. The method of claim 10 wherein the tradable events are exchanged for credit events.

12. The method of claim 10 wherein the tradable events are exchanged for no-credit events.

13. The method of claim 10 wherein the step of exchanging tradable events comprises the step of gathering tradable events and exchanging them for another one of said events of the auxiliary game when a predetermined threshold is reached.

14. The method of claim 10 wherein the step of exchanging a tradable event further comprises the step of randomly determining if a predetermined criterium is satisfied and exchanging said tradable event for another one of said events of the auxiliary game if said criterium is attained.

15. A method of processing primary-game outcomes in order to determine a prize in an auxiliary game played along with a plurality of primary games, the method comprising the following steps:

establishing, for each said primary game, a first class of outcomes associated with a credit event in said auxiliary game;

establishing, for each said primary game, a second class of outcomes associated with a no-credit event in said auxiliary game;

monitoring credit events in said auxiliary game over a predetermined number of past events in said auxiliary game, with said number of past events being constant;

monitoring a plurality of predetermined numbers or configurations of credits, allowing each credit event to contribute to more than one prize awarding criteria; and signaling that a prize in said auxiliary game is to be awarded when a predetermined number or configuration of credits is present in said predetermined number of past events in said auxiliary game.

16. The method of claim 15 further comprising the step of establishing, for each said primary game, a third class of outcomes associated with a non-event hold in said auxiliary game.

17. The method of claim 15 further comprising the step of establishing, for each said primary game, a fourth class of outcomes associated with a tradable event in said auxiliary game.

18. The method of claim 17 wherein the step of establishing said fourth class, further comprises to set the criteria as to balance, for each said primary games, the chances of winning in the auxiliary game.

* * * * *